United States Patent
Ding

(10) Patent No.: US 9,461,687 B2
(45) Date of Patent: Oct. 4, 2016

(54) MOBILE TERMINAL AND SPECIFIC ABSORPTION RATE REDUCTION METHOD

(71) Applicant: ZTE Corporation, Shenzhen (CN)

(72) Inventor: Liang Ding, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/758,881

(22) PCT Filed: Aug. 20, 2013

(86) PCT No.: PCT/CN2013/081891
§ 371 (c)(1),
(2) Date: Jul. 1, 2015

(87) PCT Pub. No.: WO2013/189387
PCT Pub. Date: Dec. 27, 2013

(65) Prior Publication Data
US 2015/0333788 A1    Nov. 19, 2015

(30) Foreign Application Priority Data

Jan. 5, 2013  (CN) .......................... 2013 1 0001996

(51) Int. Cl.

| H04M 1/00 | (2006.01) |
|---|---|
| H04B 1/3827 | (2015.01) |
| H04W 4/00 | (2009.01) |
| H01Q 3/24 | (2006.01) |
| H01Q 1/24 | (2006.01) |
| H04B 1/401 | (2015.01) |

(52) U.S. Cl.
CPC ............ H04B 1/3838 (2013.01); H01Q 1/245 (2013.01); H01Q 3/24 (2013.01); H04W 4/005 (2013.01); H04B 1/401 (2013.01)

(58) Field of Classification Search
CPC .................................................. H04B 1/3838
USPC .............................................. 455/127, 575.5
See application file for complete search history.

(56) References Cited

U.S. PATENT DOCUMENTS

| 2004/0248523 A1* | 12/2004 | Nishimura ............. H01Q 1/245 455/78 |
|---|---|---|
| 2009/0140949 A1 | 6/2009 | Stratis et al. |
| 2013/0035051 A1* | 2/2013 | Mujtaba ............... H04B 7/0808 455/277.2 |
| 2013/0045700 A1* | 2/2013 | Stallman .............. H04B 1/3838 455/129 |
| 2013/0271322 A1* | 10/2013 | Harel .................... H04B 7/0404 342/368 |

FOREIGN PATENT DOCUMENTS

| CN | 102573124 A | 7/2012 |
|---|---|---|
| CN | 102761640 A | 10/2012 |
| CN | 103067038 A | 4/2013 |
| EP | 1469550 A2 | 10/2004 |
| JP | 2003283393 A | 10/2003 |
| JP | 2006180193 A | 7/2006 |

OTHER PUBLICATIONS

International Search Report of PCT/CN2013/081891, dated Nov. 21, 2013.
Supplementary European Search Report of EP 13806958, dated Dec. 1, 2015.
* cited by examiner

*Primary Examiner* — Thomas Lett
(74) *Attorney, Agent, or Firm* — Banner & Witcoff, Ltd.

(57) ABSTRACT

A mobile terminal and a method for reducing a specific absorption rate are disclosed. The mobile terminal includes: a control unit connected to an input unit, a memory and a switch, an antenna group containing multiple antennas, and the switch connected to each antenna and the radio-frequency circuit; wherein the input unit is configured to: detect a location of the mobile terminal relative to a user, and notify the control unit of the location; the memory is configured to: store location-specific absorption rate corresponding information of each antenna; and the control unit is configured to: according to the location, search the location-specific absorption rate corresponding information for a specific absorption rate of each antenna at the location, select an antenna according to the specific absorption rate of each antenna at the location, and control the switch to connect the selected antenna with the radio-frequency circuit.

6 Claims, 2 Drawing Sheets

MOBILE TERMINAL AND SPECIFIC ABSORPTION RATE REDUCTION METHOD

TECHNICAL FIELD

The present document relates to the field of antenna technology, and particularly, to a mobile terminal and a method for reducing a specific absorption rate.

BACKGROUND

A Specific Absorption Rate (SAR) is a numerical value indicating how many electromagnetic waves radiated by a mobile terminal the human body absorbs. That is, the SAR is electromagnetic power absorbed by the human body in unit mass. Since it may cause harm to the human body when an SAR value is too high, many countries and areas stipulate an SAR limiting value. The European limiting value is 2.0 W/kg; and the America limiting value is 1.6 W/kg.

With the rapid development of the wireless communication technology, mobile terminals (such as a mobile phone and a panel personal computer, etc.) have been widely applied, and meanwhile, the impact of the electromagnetic radiation from the mobile terminal to the human health becomes a problem increasingly concerned by the public.

At present, in most SAR reduction technologies, methods such as reducing transmitter power, using wave-absorbed materials, a conductive reflector and an isolator, and coating an anti-radiation and wave-absorbing coat on an enclosure surface are adopted, but basically all these methods affect the communication signals, which does not fundamentally solve the contradiction between human body radiation security and high-quality communication.

SUMMARY

The embodiments of the present document provide a mobile terminal and a method for reducing a specific absorption rate, in a precondition of ensuring high-quality communication, an SAR value is reduced, thereby decreasing the radiation hazard of the mobile terminal to the human body and human head.

The embodiment of the present document provides a mobile terminal, which comprises: an input unit, a control unit, a memory, a switch, an antenna group and a radio-frequency circuit, wherein:
the control unit is connected to the input unit, the memory and the switch, the antenna group contains multiple antennas, and the switch is connected to each antenna of the antenna group and the radio-frequency circuit;
the input unit is configured to: detect a location of the mobile terminal relative to a user, and notify the control unit of the location obtained by detection;
the memory is configured to: store location-specific absorption rate corresponding information of each antenna in the antenna group; and
the control unit is configured to: according to the location obtained by the detection of the input unit, search the location-specific absorption rate corresponding information of each antenna stored in the memory for a specific absorption rate of each antenna in the antenna group at the location obtained by the detection, select an antenna according to the specific absorption rate of each antenna at the location obtained by the detection, and control the switch to connect the selected antenna with the radio-frequency circuit.

Alternatively, the control unit is configured to: select an antenna whose specific absorption rate value at the location obtained by the detection is less than a specific absorption rate threshold value according to the specific absorption rate of each antenna at the location obtained by the detection.

Alternatively, the control unit is configured to: before a mobile terminal service is performed and/or in a process of performing the mobile terminal service, search the location-specific absorption rate corresponding information of each antenna stored in the memory for the specific absorption rate of each antenna in the antenna group at the location obtained by the detection.

Alternatively, the input unit is a proximity sensor, a gravity sensor or an infrared sensor.

Alternatively, the location-specific absorption rate corresponding information of each antenna in the antenna group stored in the memory is pre-tested information of specific absorption rates of each antenna at different locations.

Alternatively, the embodiment of the present document further provides a method for reducing a specific absorption rate, which comprises:
a mobile terminal detecting a location of the mobile terminal relative to a user, and searching location-specific absorption rate corresponding information of each antenna in an antenna group for a specific absorption rate of each antenna at the location obtained by detection; and
the mobile terminal selecting an antenna to connect with a radio-frequency circuit according to the specific absorption rate of each antenna at the location obtained by the detection, so as to implement a mobile terminal service.

Alternatively, the mobile terminal selecting an antenna to connect with a radio-frequency circuit according to the specific absorption rate of each antenna at the location obtained by the detection comprises:
the mobile terminal selecting an antenna whose specific absorption rate value at the location obtained by the detection is less than a specific absorption rate threshold value to connect with the radio-frequency circuit according to the specific absorption rate of each antenna at the location obtained by the detection.

Alternatively, the mobile terminal searching location-specific absorption rate corresponding information of each antenna in an antenna group for a specific absorption rate of each antenna at the location obtained by detection comprises:
before performing the mobile terminal service and/or in a process of performing the mobile terminal service, the mobile terminal searching the location-specific absorption rate corresponding information of each antenna in the antenna group for the specific absorption rate of each antenna at the location obtained by the detection.

Alternatively, the mobile terminal detecting a location of the mobile terminal relative to a user comprises:
the mobile terminal detecting the location of the mobile terminal relative to the user by using a proximity sensor, a gravity sensor or an infrared sensor.

Alternatively, the location-specific absorption rate corresponding information of each antenna in the antenna group is pre-tested information of specific absorption rates of each antenna at different locations.

In conclusion, multiple optional antennas are provided in the embodiment of the present document, through auxiliary equipment such as the proximity sensor and gravity sensor, etc. currently existing in the mobile terminal, the location of the mobile terminal relative to the human body or human head is judged, and an antenna with a low SAR value in the antenna group is selected, which can reduce the radiation of the mobile terminal to the human body and human head.

PREFERRED EMBODIMENTS OF THE DOCUMENT

When a user uses a mobile terminal and the mobile terminal is close to the human body, energy radiated by the antenna will harm the human body and human head. In the embodiment, in consideration of that there will be an SAR peak value at a specific frequency band and specific location when one antenna works, an antenna group is set for the mobile terminal in the embodiment, an antenna with a preferred SAR value is selected from the antenna group to work, and the following steps are included.

In step a, a control unit of the mobile terminal determines a state of a mobile terminal service, for example, with respect to a voice service, it is to determine whether a call is initiated or whether there is a voice service incoming call and so on.

In step b, an input unit of the mobile terminal judges a location of the mobile terminal relative to the user.

In step c, before the mobile terminal service is performed and/or in a process of performing the mobile terminal service, and after the input unit determines the location of the mobile terminal relative to the user, the control unit reads location-specific absorption rate corresponding information of each antenna in the antenna group from a memory, and searches for an SAR value of each antenna at the location obtained by the detention.

In step d, the control unit selects an antenna whose SAR value is less than an SAR threshold value according to the SAR value of each antenna at the location obtained by the detention.

In step f, the control unit connects the selected antenna with a radio-frequency circuit by controlling a switch.

The location-specific absorption rate corresponding information is pre-tested information of SAR of each antenna at each location, and is stored in the memory.

It should be noted that the embodiments in the present document and the characteristics in the embodiments can be combined with each other in the condition of no conflict. The embodiments of the present document will be described in detail with reference to the accompanying drawings below.

Figure 1:
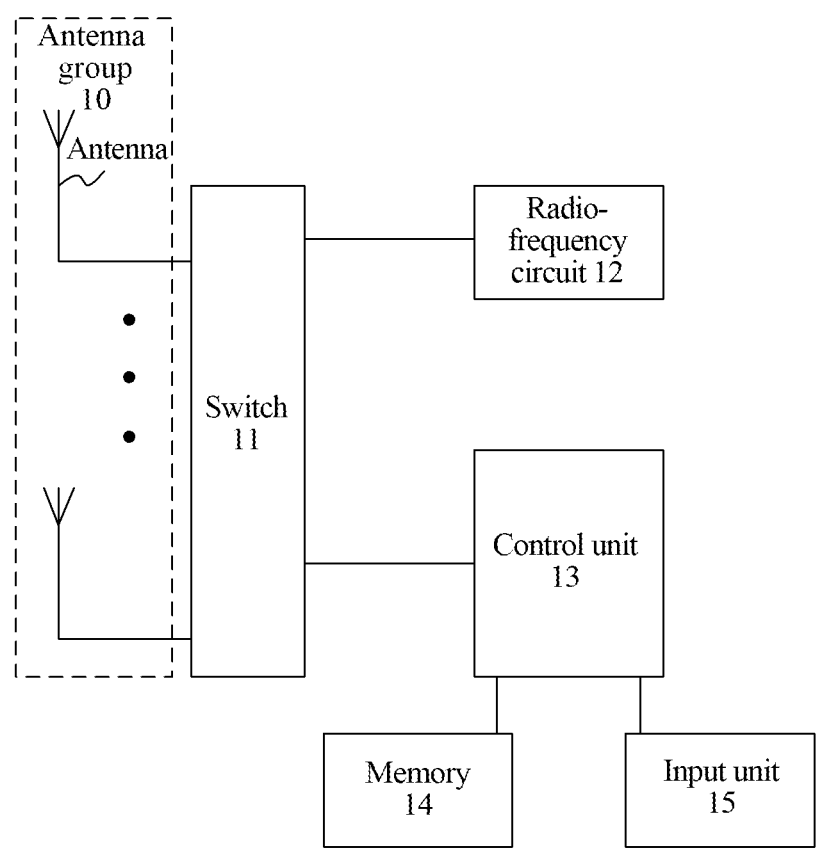
FIG. 1 is a framework chart of a mobile terminal according to the embodiment of the present document.

As shown in FIG. 1, the mobile terminal of the embodiment includes: an antenna group 10, a switch 11, a radio-frequency circuit 12, a control unit 13, a memory 14 and an input unit 15, wherein, the control unit 13 is connected to the input unit 15, the memory 14 and the switch 11, the antenna group 10 contains multiple antennas, and the switch 11 is connected to each antenna of the antenna group 10 and the radio-frequency circuit 12.

The input unit 15 is used to: detect a location of the mobile terminal relative to the user, and notify the control unit 13 of the location obtained by detection; the input unit 15 can be auxiliary equipment such as a proximity sensor, a gravity sensor or an infrared sensor and so on.

The memory 14 is used to: store location-specific absorption rate corresponding information of each antenna in the antenna group 10. The location-specific absorption rate corresponding information is pre-tested information of specific absorption rates of each antenna in the antenna group 10 at different locations.

The control unit 13 is used to: according to the location of the mobile terminal relative to the user obtained by the detection of the input unit 15, search the location-specific absorption rate corresponding information of each antenna read in the memory 14 for a specific absorption rate of each antenna in the antenna group 10 at the location obtained by the detection, select an antenna according to the specific absorption rate of each antenna at the location obtained by the detection, and control the switch 11 to connect the selected antenna with the radio-frequency circuit 12.

The control unit 13 is also required to determine a state of a mobile terminal service, before the mobile terminal service is performed and/or in a process of performing the mobile terminal service, search the location-specific absorption rate corresponding information of each antenna read in the memory 14 for the specific absorption rate of each antenna in the antenna group 10 at the location obtained by the detection, so as to select an antenna according to the specific absorption rate of each antenna at the location obtained by the detection, and control the switch 11 to connect the selected antenna with the radio-frequency circuit 12.

The control unit 13 selects an antenna whose specific absorption rate value at the location obtained by the detection is less than a specific absorption rate threshold value according to the specific absorption rate of each antenna at the location obtained by the detection. For example, an antenna with the lowest SAR value is selected to connect with the radio-frequency circuit 12 so as to complete radio-frequency transceiving.

The control unit 13 controls the whole operation of the mobile terminal, and it can be constructed by various processors.

The number of antennas in the antenna group 10 can be two or more than two antennas. The antenna types can be various, and all of them can satisfy the achievement of individual transceiving. The placement of antennas meets the condition that it can achieve the design to reach a certain Over-The-Air (OTA) performance in the mobile terminal to ensure a normal and high-quality call.

The switch 11 is used to connect and disconnect a closed circuit between the antenna in the antenna group 10 and the radio-frequency circuit 12 by control of the control unit 13.

The radio-frequency circuit 12 is used to complete processing of radio-frequency signals.

Figure 2:
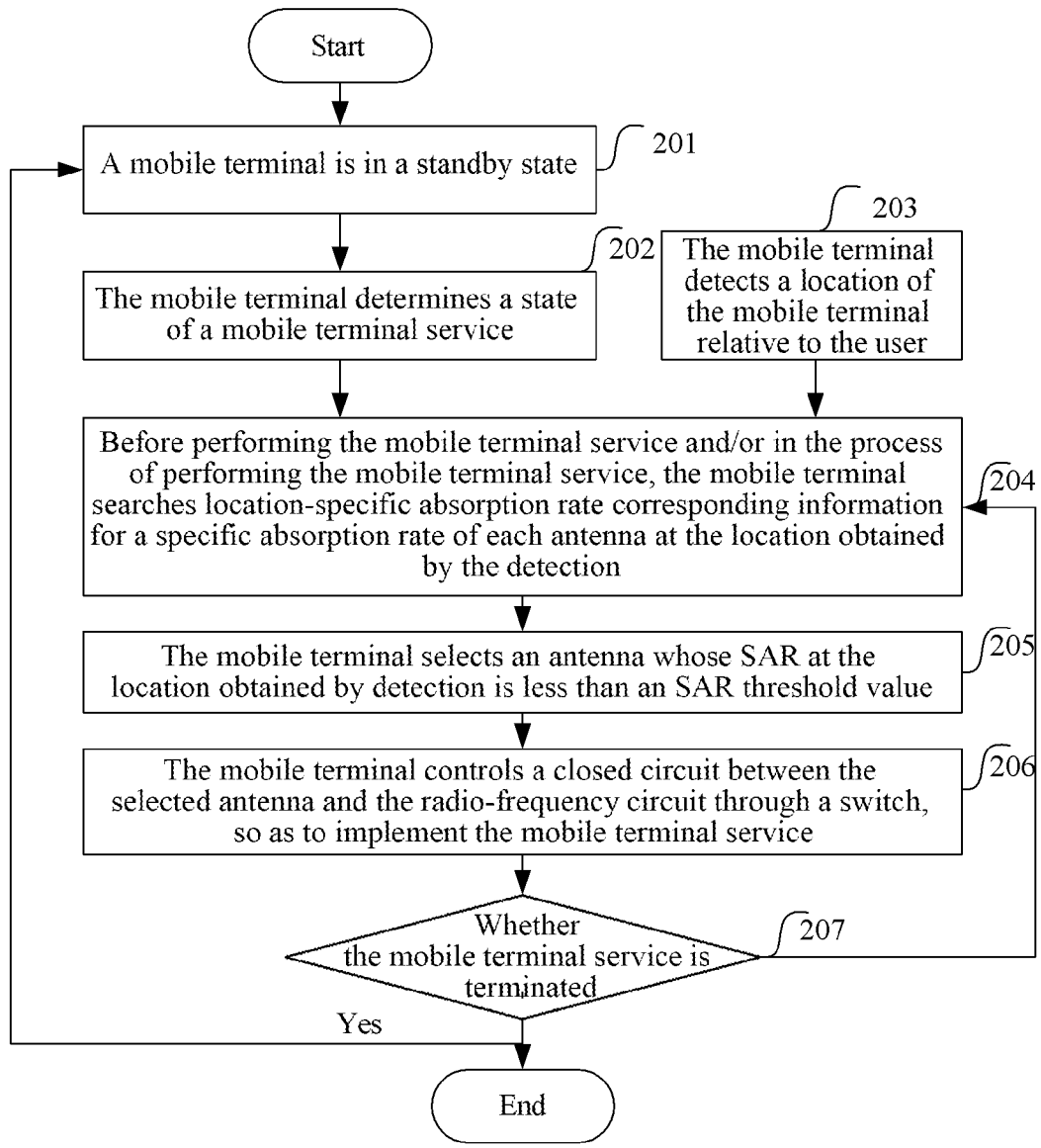
FIG. 2 is a flow chart of a method for reducing a specific absorption rate according to the embodiment of the present document.

As shown in FIG. 2, the method for reducing a specific absorption rate of the embodiment includes the following steps.

In step 201, a mobile terminal is in a standby state (initial state).

In step 202, the mobile terminal determines a state of a mobile terminal service, for example, whether the user initiates a call or is called and so on.

In step 203, the mobile terminal detects a location of the mobile terminal relative to the user (the human head/body).

In step 204, before performing the mobile terminal service and/or in a process of performing the mobile terminal service, the mobile terminal searches location-specific absorption rate corresponding information of each antenna in the antenna group for a specific absorption rate of each antenna at the location obtained by the detection.

In step 205, the mobile terminal selects an antenna whose SAR value at the location obtained by detection is less than an SAR threshold value.

In step 206, the mobile terminal controls a closed circuit between the selected antenna and the radio-frequency circuit through a switch, so as to implement the mobile terminal service.

In step 207, it is to judge whether the mobile terminal service is terminated, for example, it is to judge whether a call is terminated, if the call is terminated, it returns to the standby state; and if the call is not terminated, the step 204 is executed.

In the embodiment, the impact of the electromagnetic wave to the human body is reduced by selecting an antenna whose SAR value is less than an SAR threshold value to work.

Apparently, those skilled in the art should understand that the modules or steps of the present document mentioned above can be implemented through a universal calculating device, and they can be concentrated on a single calculating device or distributed in a network consisting of multiple calculating devices. Alternatively, the modules or steps can be implemented through program codes which can be executed by the calculating device, thus, they can be stored in a storage device to be executed by the calculating device, or they can be made into multiple integrated circuit modules respectively, or multiple modules or steps of them can be made into a single integrated circuit module to be implemented. Therefore, the embodiment of the present document is not limited to any combination of hardware and software in a specific form.

The above description is only the preferred embodiments of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

With the mobile terminal and method of the embodiments of the present document, the radiation of the mobile terminal to the human body and human head can be reduced.

What is claimed is:

1. A mobile terminal, comprising: an input unit, a control unit, a memory, a switch, an antenna group and a radio-frequency circuit, wherein:
    the control unit is connected to the input unit, the memory and the switch, the antenna group contains multiple antennas, and the switch is connected to each antenna of the antenna group and the radio-frequency circuit;
    the input unit is a sensor which is configured to: detect a location of the mobile terminal relative to a user, and notify the control unit of the location obtained by detection;
    the memory is configured to: store location-specific absorption rate corresponding information of each antenna in the antenna group; and
    the control unit is a processor which is configured to: before a mobile terminal service is performed and/or in a process of performing the mobile terminal service, according to the location obtained by the detection of the input unit, search the location-specific absorption rate corresponding information of each antenna stored in the memory for a specific absorption rate of each antenna in the antenna group at the location obtained by the detection, select an antenna whose specific absorption rate value at the location obtained by the detection is less than a specific absorption rate threshold value according to the specific absorption rate of each antenna at the location obtained by the detection, and control the switch to connect the selected antenna with the radio-frequency circuit.

2. The mobile terminal according to claim 1, wherein: the input unit is a proximity sensor, a gravity sensor or an infrared sensor.

3. The mobile terminal according to claim 1, wherein: the location-specific absorption rate corresponding information of each antenna in the antenna group stored in the memory is pre-tested information of specific absorption rates of each antenna at different locations.

4. A method for reducing a specific absorption rate, comprising:
    a mobile terminal detecting a location of the mobile terminal relative to a user, and before performing the mobile terminal service and/or in a process of performing the mobile terminal service, searching location-specific absorption rate corresponding information of each antenna in an antenna group for a specific absorption rate of each antenna at the location obtained by detection; and
    the mobile terminal selecting an antenna whose specific absorption rate value at the location obtained by the detection is less than a specific absorption rate threshold value to connect with a radio-frequency circuit according to the specific absorption rate of each antenna at the location obtained by the detection, so as to implement a mobile terminal service.

5. The method according to claim 4, wherein, the mobile terminal detecting a location of the mobile terminal relative to a user comprises:
    the mobile terminal detecting the location of the mobile terminal relative to the user by using a proximity sensor, a gravity sensor or an infrared sensor.

6. The method according to claim 4, wherein, the location-specific absorption rate corresponding information of each antenna in the antenna group is pre-tested information of specific absorption rates of each antenna at different locations.

* * * * *